United States Patent Office 3,311,596
Patented Mar. 28, 1967

3,311,596
PROCESS FOR THE PRODUCTION OF POLYMERS OF α-OLEFINS
Christoph Berding, Ludwigshafen (Rhine), Hermann Pankraz Hofmann, Frankenthal, Pfalz, Ernst-Guenther Kastning, Assenheim, Pfalz, Nikolaus von Kutepow, Karlsruhe-Rüppurr, Herbert Naarmann, Ludwigshafen (Rhine), and Hermann Reis, Limburgerhof, Pfalz, Germany, assignors to Badische Anilin- & Soda-Fabrik Aktiengesellschaft, Ludwigshafen (Rhine), Germany
No Drawing. Filed Apr. 19, 1963, Ser. No. 274,346
Claims priority, application Germany, Apr. 21, 1962, B 66,939; June 28, 1962, B 67,848
14 Claims. (Cl. 260—78.5)

This invention concerns a new process for the production of polymers of α-olefines. More specifically, the invention concerns a process for the production of polymers of α-olefines in which novel catalysts are employed.

It is known that α-olefines polymerize in the presence of certain catalysts according to an anionic reaction mechanism. Two groups of catalysts can be employed for this reaction, namely (1) organo-metallic compounds or alkali metals and (2) combined catalysts consisting of a compound of a transition metal and an organo-metallic compound.

These catalysts are sensitive to air and water and they are dangerous to handle on account of the fact, for example, that they ignite spontaneously in air. A further disadvantage in the use of these catalysts is that the monomers require extensive purification before the polymerization in order to free them from water.

Processes have also been described for the polymerization of α-olefines with catalysts which are obtained by irradiating metal chelate compounds in solutions which must be free from water, oxygen and polar compounds, with energy-rich rays such as X-rays, β- and γ-rays and neutron and proton rays. The production of the catalysts and the purification of the solvents which are suitable for the catalyst production are complicated processes, in particular, as operations with energy-rich rays require extensive protective measures. A further disadvantage is that the polymerization must be carried out with exclusion of water and atmospheric oxygen. In addition, energy-rich rays initiate the polymerization of ethylenically unsaturated compounds so that polymerization according to different mechanism takes place simultaneously with the result that non-uniform polymers are produced.

An object of this invention is a process for the production of homopolymers and copolymers of α-olefines in which it is unnecessary to submit the monomers to special purification. A further object of the invention is a polymerization process involving the use of catalysts which do not ignite spontaneously. An additional object of the invention is the production of copolymers from α-olefines and other ethylenically unsaturated monomeric polymerizable compounds.

These objects are achieved in accordance with the invention by employing metal chelate compounds of metals of groups IVB, VB, VIB, VIIB and VIII of the periodic system (Handbook of Chemistry and Physics, 38th edition, pp. 394 and 395, Chemical Rubber Publishing Co., Cleveland, Ohio) as polymerization catalysts.

The process as described in the invention can be employed for the polymerization of α-olefines with 2 to 10 carbon atoms and 1 or 2 olefinic double bonds, such as α-olefines with 2 to 4 C-atoms and a single double bond as, for example, ethylene, propylene, n-butylene-(1), isobutylene and vinyl aromatic compounds such as styrene, α-methylstyrene and 2-, 3- or 4-methylstyrene, and also α-olefines with 2 double bonds, such as butadiene-1,3, isoprene, 2-phenylbutadiene-1,3 and 2,3-dimethyl-butadiene-(1,3).

The process according to the invention can also be used for the production of copolymers of α-olefines and copolymers of α-olefines with other ethylenically unsaturated monomeric polymerizable compounds. Copolymers of α-olefines are defined as polymers which contain at least 50% by weight of α-olefines in polymerized form.

Suitable comonomers are, for example, the following ethylenically unsaturated monomeric polymerizable compounds: halogenated styrene, styrenesulfonic acid, α,β-unsaturated carboxylic acids such as acrylic acid, methacrylic acid, esters of acrylic acid with alcohols with 1 to 8 C-atoms such as methyl acrylate, ethyl acrylate, n-butyl acrylate, esters of methacrylic acid with alcohols with 1 to 8 C-atoms such as methyl methacrylate and tert. butyl acrylate, vinyl esters of alcohols with 1 to 10 C-atoms such as vinyl acetate, vinyl propionate, vinyl benzoate, vinyl ethers of alcohols with 1 to 4 C-atoms such as vinyl methyl ether and vinyl n-butyl ether, vinyl chloride, vinylidene chloride, nitriles and amides of α,β-unsaturated carboxylic acids such as acrylonitrile, methacrylonitrile, acrylamides, methacrylamide, vinyl ketones with 4 to 7 C-atoms such as methyl vinyl ketone and isopropenyl vinyl ketone, N-vinyl compounds such as vinylpyrrolidone, vinyl caprolactam, vinylimidazole and vinylcarbazole, fumaric acid, maleic acid, maleic anhydride, maleic imide, esters of maleic acid with 1 to 6 C-atoms such as diethyl maleate, dimethyl maleate, di-n-butyl maleate and the corresponding esters of fumaric acid.

Metal chelate compounds are defined as those compounds in which a metal atom is linked to two functional groups of a molecule by main valencies and coordinate bonds. Compounds of this type are, for example, described in the book "Chemistry of the Metal Chelate Compounds" by Arthur E. Martell and Melvin Calvin, New York, Prentice-Hall, Inc., 1952.

Compounds suitable for the formation of chelate complexes and containing two functional groups which can become linked with metal atoms, one group being linked by main valencies and the other by coordinate bonds, are especially β-diketones such as acetylacetone and benzoylacetone and condensation products of terephthaldialdehyde and acetylacetone of the general formula

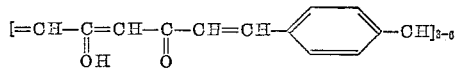

products which are obtained by a Friedel-Crafts reaction from benzene and malonic dichloride of the general formula

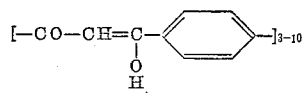

and also imides of these compounds such as acetylacetonimide [2 - aminopentene-(2)-one-(4)], β-ketocarboxylic esters such as ethyl and propyl acetoacetate, amino acids such as histidine and 1,3-diaminobutyric acid, hydroxyaldehydes such as salicyclaldehyde, dialdehydes such as chloromalondialdehyde, hydroxycarboxylic acids such as α,β-hydroxypropionic acid (lactic acid) and dihydroxymalonic acid.

The acetylacetonates and benzoylacetonates of the metals of the groups of the periodic system referred to are particularly suitable for use as polymerization catalysts for α-olefines.

The metal chelate compounds are illustrated by the following formula for an acetylacetonate:

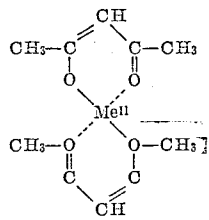

In this formula $Me^{II}$ represents a divalent metal from the groups referred to. Me can also be mono-, tri- and polyvalent.

Part of the principal or secondary valencies of the metals can be satisfied by other ligands. Such ligands are, for example, $CN^-$, $OH^-$, $CO$, $O^{--}$, and primary, secondary, or tertiary organic amines, such as trimethylamine, pyridine and diethylamine.

The metal chelate compounds are employed in a proportion of 0.0001 to 5, preferably between 0.01 and 1% by weight, calculated on the monomeric compound.

The catalytic effect of these metal chelate compounds can be increased by adding organic amines such as pyridine, piperidine and triethylamine or α,β-unsaturated carboxylic acids or their amides such as acrylic acid, methacrylic acid, acrylamide and methacrylamide in a proportion between 1:10 and 10:1, calculated on the chelate complex.

The metal chelate compounds are usually soluble in organic solvents and in the monomers. They can be handled safely in air. It is also unnecessary to employ extremely pure monomers and auxiliary substances. The polymerization can thus be carried out in the presence of water and of small quantities of atmospheric oxygen. The metal chelate compounds show a catalytic effect even in extremely low concentrations. If small quantities of catalyst are employed, then it is usually unnecessary to remove these from the polymer after the polymerization. In some cases it is possible to employ the chelate complexes on carriers such as activated charcoal, carbon black, aluminum oxide, silica gel and aluminum silicate.

It is possible by means of the metal chelate compounds described in the invention to produce copolymers from monomers from which it was previously impossible or only possible to a limited degree to produce copolymers with conventional catalysts. It is thus possible, for example, using the process described in the invention to copolymerize butadiene with ethylene, butadiene with acrylic acid, ethylene with vinyl ethers, propylene with acrylic acid and styrene with ethylene, in practically any proportion.

Certain of the polymers produced show crystalline structure. Thus, for example, polyethylene produced by the process according to the invention contains a high proportion of crystalline fraction. The density is greater than 0.95. The formation of 1,4-cis and 1,4-trans structure is promoted in the polymerization of dienes. The process according to the invention is therefore particularly suitable for the production of homo- and copolymers of α-olefines with 2 to 4 C-atoms.

The molecular weights of the polymers obtained can be varied within a wide range depending on the polymerization conditions. The polymerization can be carried out between —50 and +250° C. The preferred temperature employed depends on the nature of the monomer to be polymerized. Thus, the homo- and copolymerization of ethylene is carried out preferably at 50 to 150° C. and of styrene, butadiene and isoprene at 20 to 160° C. The process can be carried out at any convenient pressure; if desired, pressures up to approx. 4000 atmospheres and more can be used.

The metal chelate compounds can be contacted with the α-olefines by various methods. For example, they may be suspended or dissolved in the α-olefines or in solutions or suspensions of the α-olefines.

The monomers can be homo- and copolymerized with the catalysts according to the invention by block polymerization. The monomers can also be dissolved or suspended in inert liquids. Suitable inert liquids are, for example, aliphatic, cycloaliphatic and aromatic hydrocarbons such as n-pentane, n-hexane, isohexane, n-heptane, n-octane, isooctane, cyclohexane, methylcyclohexane, benzene, toluene, o-, m- and p-xylene, ethylbenzene, cumene, isopropylbenzene, tetrahydronaphthalene and decahydronaphthalene. Halogenated derivatives of these hydrocarbons are also suitable. Compounds of this type are, for example, chloroform, methylene chloride, ethylene chloride, chlorbenzene and brombenzene. Ethers such as diethyl ether, dibutyl ether, tetrahydrofuran, dioxan, glycol dimethyl ether and phenyl methyl ether and alcohols and ketones such as methanol, ethanol, propanol, isopropanol, butanols, cyclohexanol, benzyl alcohol and acetone and water are also suitable.

The polymerization can be carried out continuously or as a batch process. In the continuous polymerization the metal chelate compounds can be introduced into the reaction vessel in admixture with a monomer or with an inert liquid.

The parts and percentages given in the examples are by weight. The K-values are determined according to the method of H. Fikentscher described in Cellulose-Chemie, 13, 58, 1932.

*Example 1*

0.1 part manganese III acetylacetonate is added to 100 parts butadiene in an autoclave fitted with a stirrer and the mixture heated for 10 hours at 100° C. The pressure falls during this period from an initial value of 12 atm. to 2.3 atm. gauge. 88 parts of a high molecular weight butadiene of K-value 70.6 is obtained. The polymer contains 42% of material with 1,4-cis structure. It dissolves in benzene and toluene without forming a gel.

*Example 2*

0.3 part chromium III acetylacetonate is added to 100 parts isoprene and 100 parts benzene in an autoclave and the mixture is heated for 10 hours at 125° C. 85 parts polyisoprene of K-value 62 is formed and can be precipitated from the reaction product by means of methanol. The polymer contains no gelatinous portions and contains approximately 30% of material with 1,4-cis structure.

*Example 3*

100 parts butadiene and 100 parts di-n-butyl fumarate are mixed with 400 parts benzene and 0.1 part manganese III acetylacetonate in an autoclave fitted with a stirrer and the mixture is heated to 100° C. In the course of 12 hours the initial pressure of 10.5 atm. is reduced to 1.5 atm. gauge.

The solution obtained is highly viscous and contains 27% by weight polymer. The copolymer contains 58% dibutyl fumarate. The K-value is 60. The second order transition temperature of the copolymer is —65° C.

Example 4

This example describes the copolymerization of styrene with other monomers under the catalytic influence of manganese III acetylacetonate. 20 parts styrene is mixed with 5 parts of another monomer and 75 parts toluene and the mixture heated for 1 hour to 100° C. with the addition of 0.05 part manganese III acetylacetonate. The copolymer is isolated by precipitation with methanol.

| 20 Parts | 5 Parts | Yield in Parts | Yield, percent | Styrene Proportion in the Copolymer, percent | K-Value |
|---|---|---|---|---|---|
| Styrene | Acrylic acid | 25 | 100 | 80 | 79 |
| Do | Vinyl acetate | 22 | 88 | 90 | 68 |
| Do | Allyl alcohol | 21.5 | 86 | 92.5 | 65 |
| Do | Butyl acrylate | 24.5 | 96 | 81.5 | 72 |

Example 5

100 parts butadiene, 100 parts isobutylene, 400 parts cyclohexane and 0.1 part manganese III acetylacetonate are mixed in an autoclave fitted with a stirrer. The mixture is polymerized at 120° C. for 20 hours. During this period the pressure falls from 12.8 atm. to 3.7 atm. gauge.

A solution containing no gelatinous components is obtained with a solids content of 26%. The copolymer has a K-value of 74 (determined in 1% solution in benzene). It contains 45% isobutylene in polymerized form.

Example 6

50 parts styrene and 20 parts α-methylstyrene are mixed with 10 parts ethylbenzene and the mixture is polymerized at 100° C. with 0.1 part tungsten acetylacetonate for 60 minutes. The polymer is precipitated with methanol and washed. 60 parts polymer of K-value 78 and softening point 117° C. is obtained.

Example 7

0.03 part manganese III benzoylacetonate and 0.005 part pyridine are added to 30 parts styrene and the mixture is heated for 24 hours at 50° C. The highly viscous reaction solution is treated with 3 times its volume of methanol and the precipitated polymer is isolated. 18.7 parts polystyrene of K-value 106.5 is obtained. The softening point is 103° C. The polymer has a relatively narrow molecular weight distribution range.

Example 8

25 parts styrene, 75 parts toluene and 0.5 part chromium III acetylacetonate are mixed and the mixture is heated for 60 minutes at 100° C. The polymer obtained is precipitated from the solution with methanol, washed and dried. 20 parts polystyrene of K-value 78 is obtained. This is a yield of 80%.

Example 9

1000 parts hexane and 5 parts cobalt III acetylacetonate are placed in an autoclave and ethylene pumped in until a pressure of 1000 atmospheres is obtained. The mixture is then heated for 8 hours at 140° C. 540 parts polyethylene of K-value 87.2 (determined in a 1% solution in decahydronaphthalene) is obtained.

Example 10

1000 parts cyclohexane, 1 part cobalt III acetylacetonate and 100 parts maleic anhydride are placed in an autoclave and ethylene is pumped in at 26° C. until a pressure of 1200 atm. is attained. The mixture is heated for 5 hours at 150° C. and 400 parts of a white polymer powder is obtained with a K-value of 77. The product contains 25% maleic anhydride in polymerized form.

Example 11

150 parts vinyl ethyl ether, 800 parts n-hexane and 1 part cobalt III acetylacetonate are introduced into an autoclave and ethylene is pumped in at room temperature until a pressure of 760 atm. is attained. The mixture is then heated for 2 hours at 145° C. and 280 parts of a copolymer is obtained in the form of a fine white powder. The product melts at approx. 110° C. and has a K-value of 39. The softening point is —5° C. The copolymer contains 50% vinyl ethyl ether in polymerized form.

Example 12

300 parts n-butyl acrylate, 800 parts benzene and 1 part cobalt III acetylacetonate are introduced into an autoclave and ethylene is pumped in at room temperature until a pressure of 1000 atm. is attained. The mixture is heated for 3 hours at 140° C. The pressure rises to 1850 atm. 450 parts of a white copolymer of K-value 65 (determined in a 1% solution in decahydronaphthalene) is obtained. The copolymer contains 48.9% n-butyl acrylate in polymerized form.

Example 13

Ethylene is pumped into a solution consisting of 80 parts n-heptane and 0.1 part cobalt III benzoylacetonate in an autoclave at 30° C. until a pressure of 740 atm. is attained. The mixture is heated for 2 hours at 135° C. and 34 parts of a polymer of K-value 92 is obtained.

Example 14

Ethylene is pumped into a solution consisting of 80 parts n-octane, 0.1 part cobalt III acetylacetonate and definite quantities of the substances given in the table below in an autoclave at 30° C. until a pressure of 740 atm. is attained. The mixture is heated for 5 hours at 150° C.

TABLE

| Substance added | Yield, Parts | K-value determined in 1% solution in decahydronaphthalene |
|---|---|---|
| None | 35 | 87 |
| 1 part acrylic acid | 47 | 82 |
| 1 part methyl methacrylate | 56 | 83 |
| 0.5 part methyl methacrylate | 53 | 85 |
| 1 part triethylamine | 42 | 76 |

Example 15

0.2 part iron III acetylacetonate and 30 parts acrylic acid are dissolved in 60 parts cyclohexane in an autoclave and ethylene is pumped in until a pressure of 900 atm. is attained. The mixture is heated for 8 hours at 150° C. 40 parts of a copolymer containing 75% acrylic acid is obtained. The K-value of the copolymer is 87 (determined in 1% solution in 5% ammonia solution).

If the iron III acetylacetonate is replaced by nickel II ethyl acetoacetate, then 49 parts of a copolymer is obtained containing 61% acrylic acid in polymerized form.

Example 16

0.1 part nickel II propargyl acetoacetate is dissolved in 60 parts cyclohexane in an autoclave and ethylene pumped in until a pressure of 900 atm. is attained. The mixture is heated for 3 hours at 150° C. and 11 parts polyethylene of K-value 80 (determined in 1% solution in decahydronaphthalene) is obtained.

Example 17

0.1 part rhodium III acetylacetonate is dissolved in 60 parts cyclohexane in an autoclave and ethylene pumped in until a pressure of 900 atm. is attained. The mixture is heated for 5 hours at 150° C. and 14 parts polyethylene of K-value 83 (determined in 1% solution in decahydonaphthalene) is obtained.

Example 18

(a) A solution of 140 parts butadiene, 25 parts diethyl fumarate and 0.3 part cobalt III acetylacetonate in 80 parts n-hexane is heated for 3 hours at 160° C. in an autoclave. 163 parts of a copolymer containing 15.2% diethyl fumarate is obtained. The product has a softening point of −65° C. and a K-value of 85 (determined in 1% solution in benzene). The polymer contains 50% of material with 1,4-cis structure.

(b) The reaction is carried out under the same conditions as in (a), the monomers being polymerized with 6.3 parts cobalt III acetylacetonate and 0.1 part pyridine. 160 parts of a copolymer with a softening point of −80° C. and a K-value of 87 (determined in 1% solution in benzene) is obtained. The polymer consists of 85% of material with 1,4-cis structure. The two products dissolve in cyclohexane without forming a gel.

Example 19

140 parts butadiene, 80 parts n-hexane and 0.02 part cobalt III benzoylacetonate are heated for 5 hours at 100° C. 81 parts of a polymer of K-value 80 is obtained. The polymer dissolves without forming a gel.

Example 20

Ethylene is pumped into a solution of 100 parts butadiene and 0.1 part cobalt III acetylacetonate in 80 parts cyclohexane in an autoclave until a pressure of 400 atm. is attained. The mixture is heated for 5 hours at 150° C. and 111 parts of a copolymer of K-value 79 is obtained which is flexible down to −80° C.

Example 21

100 parts butadiene in 100 parts n-hexane is polymerized with 0.5 part cobalt III acetylacetonate and 0.3 part piperidine at room temperature. 70 parts of a gel-free polybutadiene of K-value 25 is obtained. The polymer which is flexible down to −80° C. contains 90% of material with 1,4-cis structure.

Example 22

20 parts butene-(1) is mixed with 10 parts acrylic acid, 0.03 part cobalt III acetylacetonate and 100 parts n-heptane in an autoclave. The mixture is heated for 5 hours at 150° C. and 28 parts of a copolymer of K-value 95 (determined in 1% aqueous solution) is obtained. The copolymer contains 35.5% acrylic acid in polymerized form.

Example 23

30 parts acrylic acid, 200 parts n-heptane and 0.025 part cobalt III acetylacetonate are mixed in an autoclave and propylene is pumped in at 30° C. until a pressure of 15 atm. is attained. The mixture is heated for 3 hours at 86° C. and 45 parts of a copolymer of K-value 113 (determined in 5% ammonia solution) is obtained. The copolymer contains 66% acrylic acid in polymerized form.

Example 24

A mixture of 30 parts propylene, 25 parts acrylamide and 0.05 part cobalt III acetylacetonate in 100 parts cyclohexane is heated for 6 hours at 155° C. in an autoclave. 45 parts of a copolymer of K-value 76 (determined in 1% aqueous solution) is obtained. The copolymer contains 55% acrylamide in polymerized form.

Example 25

A mixture of 50 parts isobutylene, 10 parts acrylic acid, 35 parts ethyl acrylate and 0.1 part cobalt III acetylacetonate in 100 parts benzene is heated for 10 hours at 150° C. in an autoclave. 65 parts of a polymer of K-value 68 (determined in 1% solution in cyclohexanone dimethylformamide, 1:1) is obtained. The copolymer contains 32% isobutylene, 15% acrylic acid and 53% ethyl acrylate in polymerized form.

Example 26

50 parts styrene, 50 parts n-butyl acrylate and 0.1 part cobalt III acetylacetonate are polymerized in an autoclave for 2 hours at 150° C. 80 parts of a copolymer of K-value 69 (determined in 1% solution in cyclohexanone), containing 40% styrene in polymerized form, is obtained.

Example 27

50 parts styrene and 50 parts vinyl acetate are polymerized in an autoclave for 5 hours at 150° C. in the presence of 0.1 part cobalt III acetylacetonate. 73 parts of a copolymer of K-value 54 (determined in 1% solution in cyclohexanone), containing 41% styrene in polymerized form, is obtained.

Example 28

0.1 part cobalt III acetylacetonate is dissolved in a mixture of 50 parts styrene and 50 parts benzene in an autoclave and ethylene is pumped in until a pressure of 800 atm. is attained. The reaction mixture is then heated at 150° C. 81 parts of a copolymer of K-value 68 (determined in 1% solution in benzene) is obtained. The copolymer contains 20% ethylene in polymerized form as shown by infra-red spectra measurements.

Example 29

0.2 part molybdenum III acetylacetonate is added to a mixture of 100 parts butadiene, 100 parts isoprene and 600 parts cyclohexane is an autoclave fitted with a stirrer. The mixture is heated for 10 hours at 120° C. 115 parts of a copolymer of K-value 69 is obtained. The polymer contains no gelatinous constituents and consists to the extent of approximately 35% of material with 1,4-cis structure.

Example 30

50 parts butene-2 is mixed with 100 parts toluene, 50 parts acrylic acid and 0.1 part cobalt III acetylacetonimide in an autoclave fitted with a stirrer and the mixture is heated for 10 hours at 150° C. 78 parts of a polymer of K-value 105 (determined in 1% solution in 5% ammonia solution) is obtained. The copolymer contains 64% acrylic acid. If chromium III histidinate is employed in place of cobalt III acetylacetonimide, then 62 parts of a polymer of K-value 73 (determined in 1% solution in 5% ammonia solution) is obtained. The copolymer contains 80.5% acrylic acid in polymerized form.

If 0.2 part vanadyl triacetylacetonate is employed as catalyst, then 65 parts of a copolymer of K-value 84.5 is obtained. The polymer contains 77% acrylic acid in polymerized form.

Example 31

30 parts propylene is mixed in an autoclave with 25 parts acrylamide, 100 parts cyclohexane and 0.2 part of a chelate complex of the following structure:

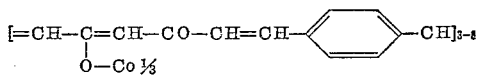

The mixture is heated with stirring for 6 hours at 155° C. 38 parts of a copolymer containing 66% acrylamide in polymerized form is obtained. The product is only partially soluble and the soluble fraction has a K-value of 81.5 (determined in 0.5% dimethylformamide solution).

Example 32

25 parts butadiene is mixed with 75 parts styrene, 100 parts toluene and 2 parts of a chelate complex of the following formula

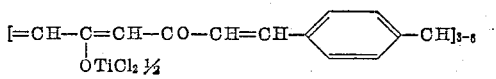

The mixture is heated with stirring for 5 hours at 120° C. 97 parts of an insoluble copolymer is obtained, containing 21.7% butadiene, 76.3% styrene in polymerized form and 2% of the catalyst.

Example 33

50 parts styrene and 1 part of a chelate complex of the formula

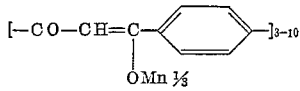

are heated for 5 hours at 100° C. A polymer of K-value 62 is obtained.

Example 34

70 parts styrene, 30 parts butyl acrylate and 0.5 part cobalt III chloromalondialdehyde are heated in an atmosphere of nitrogen for 2 hours at 150° C. in an autoclave. 88.5 parts of a copolymer of K-value 61 (determined in 1% solution in cyclohexanone) is obtained. The polymer contains 74.5% styrene in polymerized form.

If 0.5 part cobalt III 1,3-diaminobutyric acid is employed in place of the cobalt-dialdehyde complex, then 83 parts of a copolymer of K-value 57 (determined in 1% solution in cyclohexanone) is obtained. The polymer contains 76% styrene in polymerized form. If 0.5 part manganese III lactate is employed in place of the cobalt-dialdehyde complex, then 87 parts of copolymer of K-value 59 (determined in 1% solution in cyclohexanone) is obtained. The polymer contains 73.5% styrene in polymerized form.

Example 35

0.1 part zirconyl IV dihydroxymaleate is dissolve in a mixture of 50 parts vinyl acetate and 50 parts cyclohexanone in an autoclave and ethylene is pumped in until a pressure of 660 atm. is obtained. The mixture is then heated for 10 hours at 145° C. 102 parts of a copolymer of K-value 58.5 (determined in 1% solution in decahydronaphthalene) is obtained. The copolymer contains 46% vinyl acetate in polymerized form.

Example 36

50 parts styrene, 10 parts vinyl acetate and 0.1 part zirconyl IV acetylacetonate are heated in an autoclave for 10 hours at 150° C. 58 parts of a copolymer of K-value 51.5 (detrmined in 1% solution in cyclohexanone) containing 84.5% styrene in polymerized form is obtained.

Example 37

0.1 part vanadinum III acetylacetonate is dissolved in a mixture of 50 parts cyclohexane and 50 parts acrylic acid in an autoclave. Butadiene is pumped in until a pressure of 60 atm. is attained. The mixture is then heated to 160° C. 68.5 parts of a copolymer of K-value 107 (determined in 1% solution in N-methylpyrrolidone) is obtained. The copolymer contains 73% acrylic acid in polymerized form.

Example 38

0.5 part molybdenum III acetylacetonate is added to 100 parts hexane in an autoclave and purified propylene pumped in until a pressure of 50 atm. is attained. Polymerization is carried out at a temperature of 125° C. for 10 hours. 10 parts polypropylene of K-value 67 (determined in 1% solution in decahydronaphthalene) is obtained.

If 0.5 part titanium IV dichloroacetylacetonate is added to the mixture and the polymerization carried out under the same conditions, then 14 parts polypropylene of K-value 74 (determined in 1% solution in decahydronaphthalene) is obtained. If 0.5 part tungsten III acetylacetonate is employed as catalyst then 10 parts polypropylene of K-value 59 (determined in 1% solution in decahydronaphthalene) is obtained.

Example 39

0.1 part cobalt III salicylaldehyde is mixed with 80 parts cyclohexane and ethylene pumped in until a pressure of 900 atm. is attained. The mixture is heated for 5 hours at 150° C. 21.1 parts polyethylene of K-value 58 (determined in 1% solution in decahydronaphthalene), and density 0.951, is obtained.

We claim:
1. A process for the production of a polymer of an α-olefine which comprises contacting an α-olefine with 2 to 10 carbon atoms and 1 to 2 olefinic double bonds with a single active catalyst consisting of at least one metal chelate compound of
   (A) a metal selected from the class consisting of metals of Groups IVB, VB, VIB, VIIB and VIII of the periodic system, and
   (B) a compound capable of forming a chelate complex selected from the group consisting of β-diketones, β-ketocarboxylic esters, acetylacetonimide, salicylaldehyde, chloromalondialdehyde, α-hydroxypropionic acid, dihydroxymalonic acid, histidine and 1,3-diaminobutyric acid.

2. A process as claimed in claim 1 wherein a homopolymer is produced from a single α-olefine monomer.

3. A process as claimed in claim 1 wherein a copolymer is produced from at least two α-olefine monomers.

4. A process as claimed in claim 1 wherein a copolymer is produced from a polymerizable mixture of said α-olefine and at least one other ethylenically unsaturated monomeric polymerizable compound.

5. A process as claimed in claim 4 wherein said other ethylenically unsaturated monomeric polymerizable compound is selected from the group consisting of α,β-unsaturated monocarboxylic acids and their esters, amides and nitriles, vinyl esters, vinyl ethers, vinyl ketones, vinyl chloride, vinylidene chloride, vinylprrolidone, vinyl caprolactam, vinylimidazole, vinylcarbazole, fumaric acid, maleic acid, maleic anhydride, maleic imide and the diesters of fumaric and maleic acid.

6. A process as claimed in claim 1 wherein the catalytic activity of said metal chelate compound is promoted by the addition of an organic amine.

7. A process as claimed in claim 4 wherein the catalytic activity of said metal chelate compound is promoted by the addition of an organic amine.

8. A process as claimed in claim 1 wherein said metal chelate compound is employed in a proportion of 0.0001 to 5% by weight with reference to the monomeric compound.

9. A process as claimed in claim 1 wherein said metal chelate compound is employed in a proportion of 0.01 to 1% by weight with reference to the monomeric compound.

10. A process as claimed in claim 1 wherein said metal chelate compound is manganese III acetylacetonate.

11. A process as claimed in claim 1 wherein said metal chelate compound is chromium III acetylacetonate.

12. A process as claimed in claim 1 wherein said metal chelate compound is manganese III benzoylacetonate.

13. A process as claimed in claim 1 wherein said metal chelate compound is cobalt III acetylacetonate.

14. A process as claimed in claim 1 wherein said metal chelate compound is cobalt III benzoylacetonate.

References Cited by the Examiner
UNITED STATES PATENTS
3,067,181   12/1962   Keniber _____ 260—85.5
3,081,287   3/1963   Coover et al. _____ 260—94.9

JOSEPH L. SCHOFER, Primary Examiner.

M. B. KURTZMAN, Assistant Examiner.